Patented June 15, 1926.

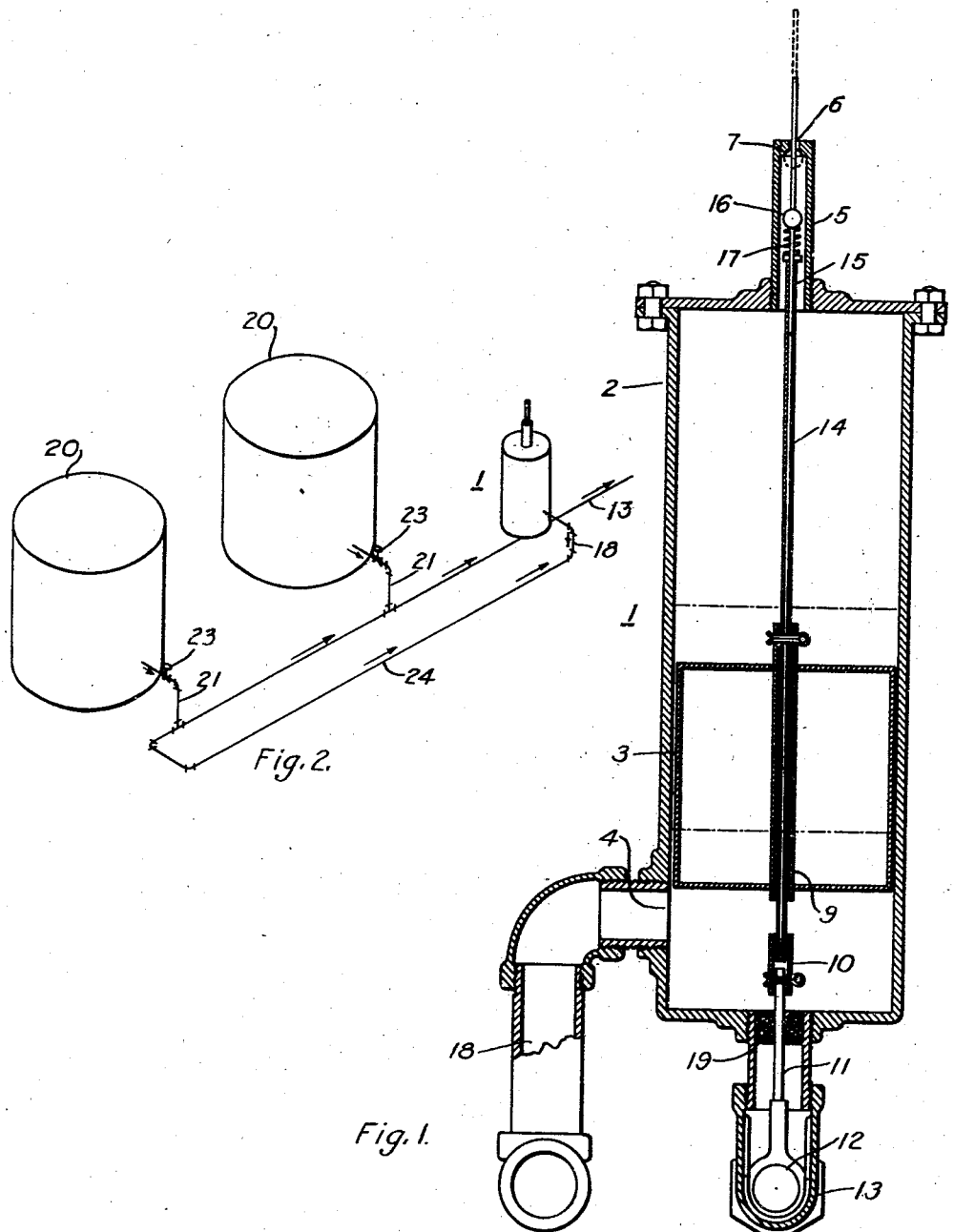

1,588,712

UNITED STATES PATENT OFFICE.

SIMON P. DUCK, OF JENKS, OKLAHOMA.

VALVE-CONTROLLING APPARATUS.

Application filed November 15, 1924. Serial No. 750,036.

My invention relates to valve-controlling apparatus, and it has particular relation to such apparatus as is adapted for controlling the flow of liquid from tanks to pipe lines connected thereto.

One object of my invention is to provide an apparatus for automatically controlling the connection of a container for liquid to outlet means therefor in accordance with the height of the liquid in the container.

A second object of my invention is to provide apparatus for automatically closing the connection between a tank and a pipe line for preventing the access of air to the pipe line upon the cessation of flow of liquid from the container.

A further object of my invention is to provide valve-controlling apparatus which operates automatically to open and to close the valve, according as the liquid supplied thereto exceeds or falls below a predetermined level.

In the emptying of oil tanks into pipe lines for conveying the oil to refineries or to other storage tanks, it may occur that the level of the oil within the tanks falls below the outlet opening before the gauger, or operator who measures the oil, has closed the valve in the outlet or drain pipe. In such case, air is likely to be admitted to the pipe line and the vacuum of the system, which may be operating on the gravity flow principle, may be destroyed. In such case, it is necessary to restore the vacuum before oil will flow in the pipe line, and this operation is sometimes comparatively difficult, as well as undesirable, because of the delay in operation of the pipe line.

In accordance with the present invention, I provide a valve-controlling apparatus which operates automatically to open a main valve in the pipe line when the gauger has opened the valve in the outlet or drain pipe of a tank to be emptied. The main valve remains open so long as the fluid pressure which corresponds to the head or height of the liquid in the tank remains above a predetermined value. The valve-controlling device is arranged, however, to close the main valve in the pipe line before the level of the oil in the tank falls to the opening in the outlet pipe and thus prevents the entrance of any air into the pipe line from that source. Accordingly, the vacuum of the pipe line is maintained at all times and delays in the transmission of oil are avoided.

Reference may now be had to the accompanying drawing, in which—

Figure 1 is a view, partially in longitudinal section and partially in elevation, of the valve-controlling device embodying my invention; and Fig. 2 is a diagrammatic view of a system comprising a plurality of tanks, the connection of which to a pipe line is controlled by the device of Fig. 1.

Referring particularly to Fig. 1, a valve-controlling device 1 comprises an air-tight cylinder 2 and a float 3 that is adapted for limited movement therein. The cylinder is provided with an inlet port 4 at its lower end whereby fluid pressure may be transmitted thereto. The cylinder is provided, also, at its upper end, with a tubular member 5, the outer end of which is provided with a relatively small opening 6 that constitutes an air vent and which is also provided, on its inner surface, with a ground valve seat 7 for a purpose to be hereinafter described.

The float 3 is mechanically connected, by a rod 9, a universal joint 10 to prevent sticking of the float and a valve stem 11, to a gate valve 12 which may, for example, control a pipe line that is shown in section at 13. The rod 9 is connected at its upper end to a smaller rod 14 that is provided with a tubular opening at its upper end within which is slidably mounted a rod 15 that extends upwardly through the opening 6 in the tubular member 5.

The rod 15 carries a ball valve 16 for cooperation with the valve seat 7. A spring 17, which is located between the upper end of the rod 14 and the ball valve 16, yieldingly maintains the rods 14 and 15 and their associated parts in the positions in which they are illustrated.

In the operation of the valve-controlling device 1, it may be assumed that liquid from any convenient source, such, for example, as an oil tank, is supplied to the cylinder 2 through the inlet port 4 and a connected pipe 18. If the liquid rises to a predetermined level, it exerts sufficient force upon the float 3 to lift the latter together with its associated parts, including the gate valve 12. During the upward movement of the float 3 and the liquid, air escapes from the vent 6 until the ball valve 16 engages the valve seat 7, further movement of the float compressing the spring 17 to more firmly seat the valve. The valve 16 retains a certain quantity of air in the cylinder 2 and prevents the oil rising beyond a desired height therein.

The uppermost position of the float 3 is indicated by dot-and-dash lines which corresponds to the fully open position of the valve 12. The float 3 and the valve 12 occupy the positions to which they are actuated so long as the liquid in the cylinder exceeds a predetermined level.

It will be noted that a stuffing box 18, which surrounds the rod 11, effectively prevents the leakage of any oil from the pipe line 13 into the cylinder 2.

When the liquid in the cylinder 2 falls below the maximum level necessary to maintain the float in its uppermost position, the weight of the valve 12 and the connected parts causes the valve to be closed to a corresponding degree. The valve 12 should be arranged to be fully closed when the liquid level corresponds to a desired minimum height of liquid in a tank or other container. The initial downward movement of the liquid within the cylinder and of the float is permitted by reason of the air under compression in the upper portion of the cylinder, the valve 16 opening to admit air during the latter portion of the movement. When the valve is fully closed, all of the moving parts of the valve-controlling device are then in the respective positions in which they are illustrated.

Reference may now be had to Fig. 2, in which is illustrated a system of storage tanks connected to a pipe line for transmission of their contents, together with a valve-controlling device such as that shown in Fig. 1, for controlling the flow of liquid in the pipe line. A system of tanks 20, only two of which are shown by way of illustration, are connected, through outlet or drain pipes 21, to the pipe line 13. The drain pipes 21 are provided with manually-operable valves 23.

The valve-controlling device 1 controls a gate valve, such as valve 12 of Fig. 1, that is located in any convenient portion of the pipe line 13. The valve-controlling device 1 is connected, by means of the pipe 18 and an auxiliary pipe line 24, to the outlet or drain pipes 21 of the tank. The elevation of the valve-controlling device 1 is suitably arranged relatively to the height of the outlet openings of the respective tanks into the drain pipes 21 whereby the valve-controlling device will operate to close the main valve in accordance with the desired minimum level of oil in the tanks.

It may be assumed that it is desired to drain the pipes 20 into the pipe line 13. It is customary for a gauger to measure the height of the oil in the tanks before the connections to the pipe line are opened. The next operation is to open the valve 23 of the tank to be drained, whereupon oil will flow through the auxiliary pipe line 24 and the pipe 18 into the cylinder of the valve-controlling device 1 in the manner previously described. The float 3 is actuated upwardly to open the valve in the pipe line and oil then flows into the pipe line 13 until the level in the tank reaches the minimum for which the device 1 is adapted to operate.

When the predetermined level is reached, which is usually slightly above the opening into the drain pipe 21, the float 3 and the valve controlled thereby fall to the positions in which the pipe line is closed. The flow of liquid in the pipe line 13 then ceases and it is not possible for air to enter the pipe line through the drain pipe 21, as would occur in case the level of the liquid were allowed to descend below the opening. When the gauger returns to measure the oil at its low level, the gate valve 23 is closed.

The foregoing operation may be repeated for each of the tanks to be emptied, the valve-controlling device operating automatically upon the opening of the corresponding valve 23 to open the pipe line and to permit the flow of the oil therethrough so long as the oil in the tank being emptied is above the predetermined level.

It will be noted that, by means of the valve-controlling device described above, all of the pipe system, including that between the main controlling valve and the valves in the drain pipes of the several tanks, is maintained full of oil and that the access of air to any portion thereof is effectively prevented.

While my invention has been described in connection with the draining of oil tanks into pipe lines, for which use it is peculiarly adapted, it is to be understood that such use is described by way of example only. For example, if the valve 12 is arranged to be closed in its uppermost position and open in its lowermost position, the valve-controlling device may be employed to maintain a supply tank of water, oil or other liquid at any desired maximum level. For such use, the ball valve 16 is not essential, as there will be no tendency for the liquid to rise to the top of the cylinder. The same result may be secured by connecting the valve-controlling device 1 to the valve 12 by a simple lever to reverse their relative movements. The valve-controlling device may, also, be used to control a gate valve of any size that may be located at a remote point or may be somewhat inaccessible. A manually-controlled line for supplying liquid to the cylinder will cause the float and connected valve to be operated in either direction at will.

It will be obvious that other applications of my invention will occur to those skilled in the art and it is desired therefore, that the scope of my invention is to be limited only as indicated in the appended claims.

I claim as my invention:—

1. The combination with a tank and a pipe line directly connected thereto, of a valve in said pipe line, a cylinder directly connected to said tank and in axial alinement with said valve, a float in said cylinder and directly connected to said valve for controlling said valve in accordance with the level of the contents of said tank, a valve for controlling the connection of said tank to said pipe line and to said cylinder, and means for preventing flow of liquid between said cylinder and said pipe line adjacent to said valve, said float and said valve being biased toward the closed position of said valve.

2. The combination with a tank and a pipe line connected thereto, of a valve in said pipe line and automatic means for operating said valve to permit the flow of the contents of said tank into said pipe line and to prevent the entrance of air to said pipe line as would occur upon the fall of the contents of said tank to a level below an outlet therefor, said means comprising a float member connected to said valve and in alinement therewith, said float member being responsive to a predetermined minimum level of the contents of said tank, said minimum level being above said outlet and a valve between said tank and said float member for controlling the application of liquid to said member.

3. The combination with a tank having an outlet opening and a controlling valve and a pipe line directly connected to said tank through said valve, of a valve in said pipe line and automatic means for operating said pipe line valve upon the opening of said controlling valve under predetermined conditions and for closing said pipe line valve when the contents of said tank fall to a predetermined minimum level above said opening to prevent the entrance of air to said pipe line upon the cessation of flow of liquid from said tank, said means comprising a cylinder also directly connected to said tank through said controlling valve, and a float in said cylinder and connected to said valve.

4. An automatic cut-off for oil tanks comprising a cylinder having an opening therein for the transmission of liquid thereto and having also an air vent, of a float therein, means for controlling said air vent in accordance with the position of said float, a pipe line and a valve operatively connected to said float for controlling said pipe line.

5. The combination with an oil tank and a cylinder having an air vent and an inlet port, of a float in said cylinder having a path of travel between said port and said air vent, a pipe line, a valve for controlling said pipe line and connected to said float for actuation thereby and means for closing said air vent when said valve occupies one of its positions.

6. The combination with a tank for containing liquid and a pipe line directly connected to said tank for receiving said liquid, of a valve in said pipe line and controlling means for said valve comprising a cylinder connected to said tank independently of said pipe line and positioned in vertical alinement with said valve, a float in said cylinder directly connected to said valve and controlled in accordance with the height of the liquid in said tank whereby the valve is opened when the liquid supplied to said cylinder exceeds a predetermined level and said valve is closed when the liquid in said tank falls to a predetermined level that is above an outlet opening in said tank and air is thereby prevented from entering the pipe line, means adjacent to said pipe line valve for preventing the flow of liquid into said cylinder, and means for controlling the connection between said tank and said cylinder.

7. The combination with a plurality of tanks and a pipe line connected thereto, of a valve in said pipe line, a valve for controlling the connection of each tank to said pipe line, and means for automatically controlling the pipe-line valve in accordance with the open position of one of the tank valves and the level of the contents of the corresponding tank, said pipe line and said controlling means being respectively directly connected to said tanks through the several tank valves.

8. The combination with a plurality of tanks and a pipe line connected in common thereto, of a valve for controlling the connection of each tank of said pipe line, a valve in said pipe line, a device for controlling the pipe-line valve in accordance with the open or closed positions of the respective tank-valves and the level of the contents of a tank the valve of which is open, said pipe line being connected to said tanks directly through the respective tank valves, and means for transmitting fluid pressure from any of said tanks to said device independently of the position of said pipe-line valve.

9. An automatic cut-off for oil tanks comprising a cylinder having an air vent and an inlet port, a float therein, a pipe line, a valve connected to said float for controlling said pipe line, means carried by said float for opening or closing said air vent in accordance with the position of said valve, and a second valve for controlling communication of a tank with said inlet port and with said pipe line.

In testimony whereof, I have hereunto subscribed my name this 10th day of November, 1924.

SIMON P. DUCK.